(12) United States Patent
Stridal et al.

(10) Patent No.: US 6,732,860 B1
(45) Date of Patent: May 11, 2004

(54) COVER FOR COMPACT DISCS

(75) Inventors: Arild Stridal, Holmestrand (NO); Thor Eide, Åsgårdstrand (NO); Kjell Thoresen, deceased, late of Holmestrand (NO), Margareth Thoresen, legal representative (73) Assignee: Cover A/S, Holmestrand (NO)

( * ) Notice: Subject to any disclaimer, the term of this patent is extended or adjusted under 35 U.S.C. 154(b) by 0 days.

(21) Appl. No.: 10/168,518

(22) PCT Filed: Nov. 15, 2000

(86) PCT No.: PCT/NO00/00382

§ 371 (c)(1), (2), (4) Date: Sep. 30, 2002

(87) PCT Pub. No.: WO01/46958

PCT Pub. Date: Jun. 28, 2001

(30) Foreign Application Priority Data

Dec. 21, 1999 (NO) .................. 996383

(51) Int. Cl.$^7$ ............... B65D 85/57
(52) U.S. Cl. ............... 206/308.1
(58) Field of Search ............... 206/308.1, 309, 206/313, 310, 307, 485, 493, 508, 509, 512, 232; 211/41.12, 163, 168; 312/9.58, 9.61, 9.64, 9.47, 9.45; 220/848, 4.26, 4.22

(56) References Cited

U.S. PATENT DOCUMENTS

| | | | | |
|---|---|---|---|---|
| 5,232,275 A | * | 8/1993 | Yamazoe | 312/9.58 |
| 5,547,078 A | * | 8/1996 | Iida | 206/308.1 |
| 5,697,684 A | | 12/1997 | Gyovai | |
| 5,715,948 A | * | 2/1998 | Hung | 211/40 |
| 5,848,688 A | * | 12/1998 | Paloheimo | 206/308.1 |

FOREIGN PATENT DOCUMENTS

DE 9412484.1 U1 11/1994

* cited by examiner

Primary Examiner—Shian Luong
(74) Attorney, Agent, or Firm—Jenkens & Gilchrist, P.C.

(57) ABSTRACT

A cover for storing and sending compact discs is described, which cover includes an upper part (7) and a lower part (1), which upper part (7) and lower part (1) can be swivelled relative to each other, and one of the parts (1, 7) is provided with a portion (2) for placement of the compact disc, means (3) of retaining the compact disc, and means (6, 8) of attaching the parts (1, 7) to each other in a separable manner, where the lower part (1) and the upper part (7) are hinged to each other and can be swivelled through an angle of 360° in parallel relative to each other.

8 Claims, 7 Drawing Sheets

COVER FOR COMPACT DISCS

The present invention regards a cover for storage and sending of compact discs, including an upper part and a lower part, which upper part and lower part swivel in relation to each other, and one of the parts is provided with a portion for positioning of the compact disc, a means of retaining the compact disc, and a means of attaching the parts to each other in a separable manner.

A number of different types of covers for compact discs (CDs) are known. The most common type of cover used for most CDs consists of an approximately square box consisting of an upper part, a lower part and an insert that holds the actual CD. The upper and lower parts are hinged to each other, and the insert is set in the lower part. A disadvantage of this solution is the fact that it requires a lot of space, among other things because the cover is much thicker than the CD itself, and because the cover is approximately square, while the CD is round. Another disadvantage of this solution is that the cover is susceptible to breaking if for instance it were to fall to the ground. Yet another disadvantage of this known solution is the fact that it includes no means of linking one cover to another, making it impossible to stack the covers without the help of an appropriately designed rack. As this known solution comprises three separate components to be assembled, it will be a relatively expensive solution.

German patent DE 197 46 035 A1 discloses a rack for storing CDs, in which is used a special holder for the actual CD. The holder has a generally rectangular shape with two slot-like grooves on the lower end wall for placement on complementary, shaped rails in the rack itself.

U.S. Pat. No. 5,791,467 discloses a cover for CDs, which cover has a generally circular shape. The cover is on the one hand circular, with a radius that essentially corresponds to that of the CD, and on the other hand equipped with two opposing pockets. The cover is clear, so as to allow the CD to be played while the cover is on.

From Norwegian patent application no. 941713, a cover for CDs is known, consisting of a lower part, an upper part and an insert, all of which are hinged to each other, so that the cover can be opened and the insert holding the CD can be swung out.

From Norwegian patent application no. 934783 there is known a cassette for CDs and similar objects, consisting of a box with an open side and an insert that may be pushed into the box. The CD is held by the insert.

From U.S. Pat. No. 5,697,684 A there is known a device for stacked storage of flat-packed objects such as CDs. The device includes a number of flat covers for the CDs, the covers are stacked and hinged at the rear end, so that they may be rotated horizontally about a vertical axle extending along the entire length of the stack. The end points of the axle are connected to a top and a bottom plate.

From U.S. Pat. No. 5,813,740 A there is known a system of covers that may be attached to each other via hinging means at the rear edge of the cover. Each cover is approximately square with said hinging means located at the rear edge, which means is shaped as a hole with outwardly projecting outer edges that can engage the adjacent covers above and below. Furthermore, the front of the covers has a slot for inserting e.g. CDs, as well as a cut-out for easy access to said CDs.

In addition, a number of different storage boxes for CDs are known, where the storage boxes include different types of swing-out or removable holders for the CDs.

An object of the present invention is to provide a CD cover that requires a minimum of space when compared with previously known solutions.

Another object is to provide a CD cover of the type mentioned at the beginning, which can be stacked in such a manner as to make each CD cover easily accessible, and which forms a compact stack.

Yet another object of the CD cover according to the present invention is to provide a CD cover with sufficient strength to be sent without requiring further packaging.

This is achieved by a cover for storage and sending of CDs, including an upper part and a lower part, which upper part and lower part swivel in relation to each other, and one of the parts is equipped with a portion for placement of the CD, means of retaining the CD, and means of attaching the parts to each other in a separable manner, characterised in that the lower part and the upper part are hinged to each other and can be swivelled through an angle of 360° in parallel in relation to each other.

The hinge sections of the upper part and the lower part preferably include complementary shaped peg-and-hole means for formation of a rotatable snap-in locking device.

The interior of the peg is preferably hollow and shaped complementary to the top of the peg, so that a peg from an underlying cover may be introduced into the hollow part of the peg of an overlying cover to engage this.

The lower part is further preferably equipped with one or more holes shaped complementary to the peg, so that a first cover can be connected to a second, overlying cover.

The lower and upper parts are preferably each equipped with complementary locking means for closing the upper and lower parts together.

The cover is preferably made from plastic or metal or a combination of these, which metal is preferably magnesium or aluminium.

In the following, the invention will be explained in greater detail by means of embodiments, with reference to the accompanying drawings, in which.

Figure 1:
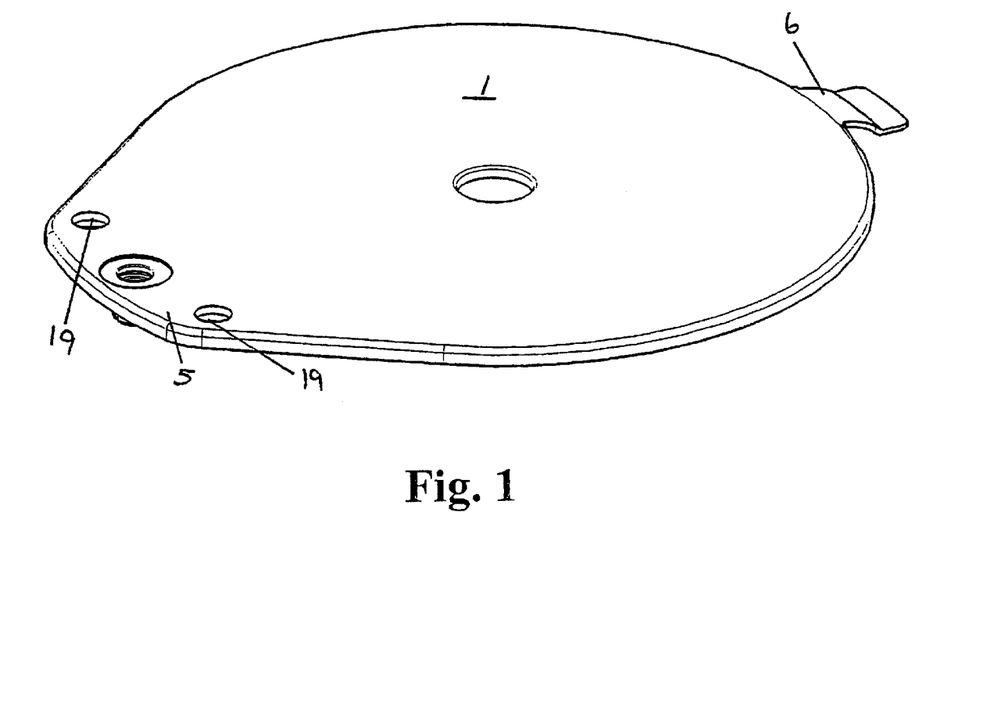
FIGS. 1 and 2 are perspective drawings showing the lower part of the CD holder, seen from below and from above respectively.
Figure 2:
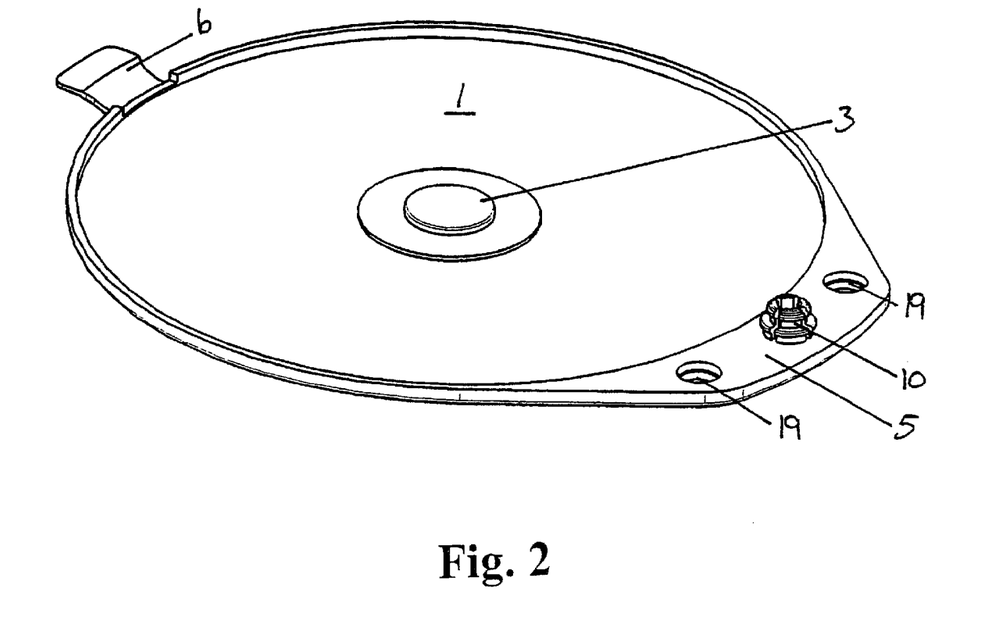

FIGS. 1 and 2 show the lower part 1 of the CD cover in perspective, seen from below and from above respectively. This lower part 1 may have a generally circular shape with a circular recessed portion 2, which recessed portion 2 has a diameter and a depth approximately equal to the diameter and the thickness of a CD. The middle of the recessed portion 2 is preferably provided with a circular lug 3 having a height that essentially corresponds to the depth of the recessed portion and a diameter that is approximately equal to the central hole in a standard CD. This lug 3 may possibly also be provided with means that provide resilient support for the CD. When the CD is positioned in the lower part 1, the CD will be approximately flush with the surrounding edge 4 and possibly the central lug 3. The lower part 1 further includes hinging means 5 and locking means 6 that will be explained further in the following.

The lower part 1 is further equipped with at least one through hole 19 in the hinging means 5. In the embodiment shown in FIG. 1, the hinging means 5 is provided with two through holes 19 located on either side of a peg 10.

Figure 3:
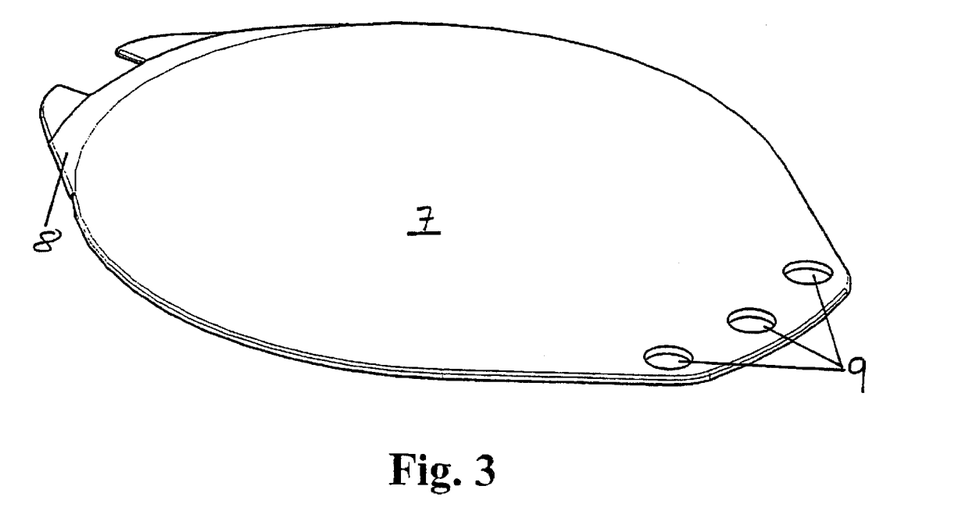
FIGS. 3 and 4 are perspective drawings showing the upper part of the CD holder, seen from above and from below respectively.
Figure 4:
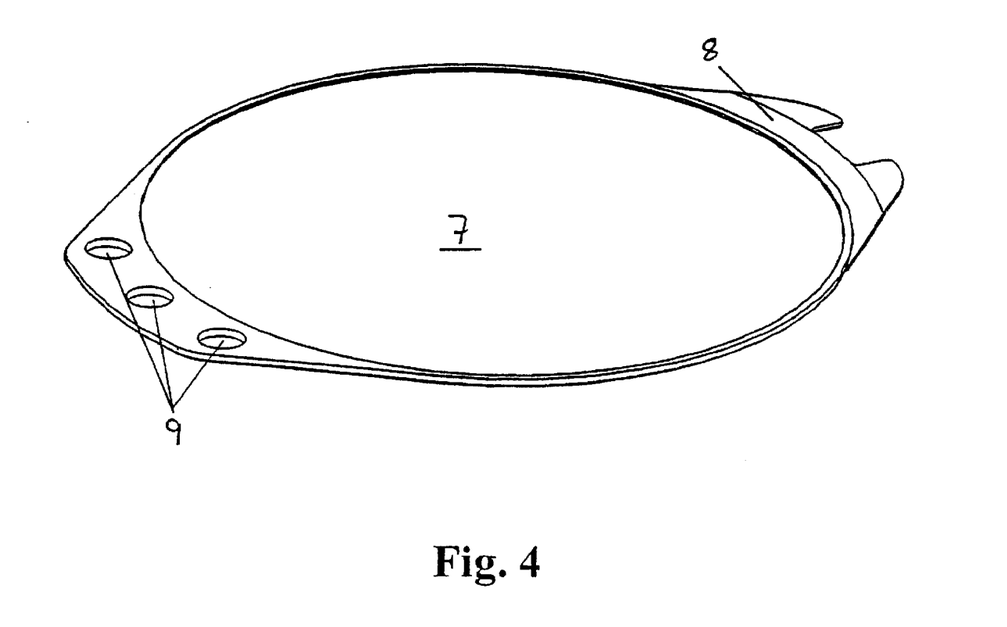

In FIGS. 3 and 4, the upper part of the CD cover according to the present invention is shown in a perspective view, from above and from below respectively. The upper part 7 consists of an essentially circular plate-shaped body with hinging means 9 and locking means 8.

The upper part 7 of the CD cover may have a recessed portion corresponding to the recessed portion 2 of the lower part 1. The object of this is to be able to place sheets of paper or cardboard containing printed information over and possibly wider the CD that is to be placed in the cover. For this reason, the upper part 7 may be equipped with outwardly projecting studs (not shown) in the plane of the upper part, for retaining the sheets of paper or pieces of cardboard.

Figure 5:
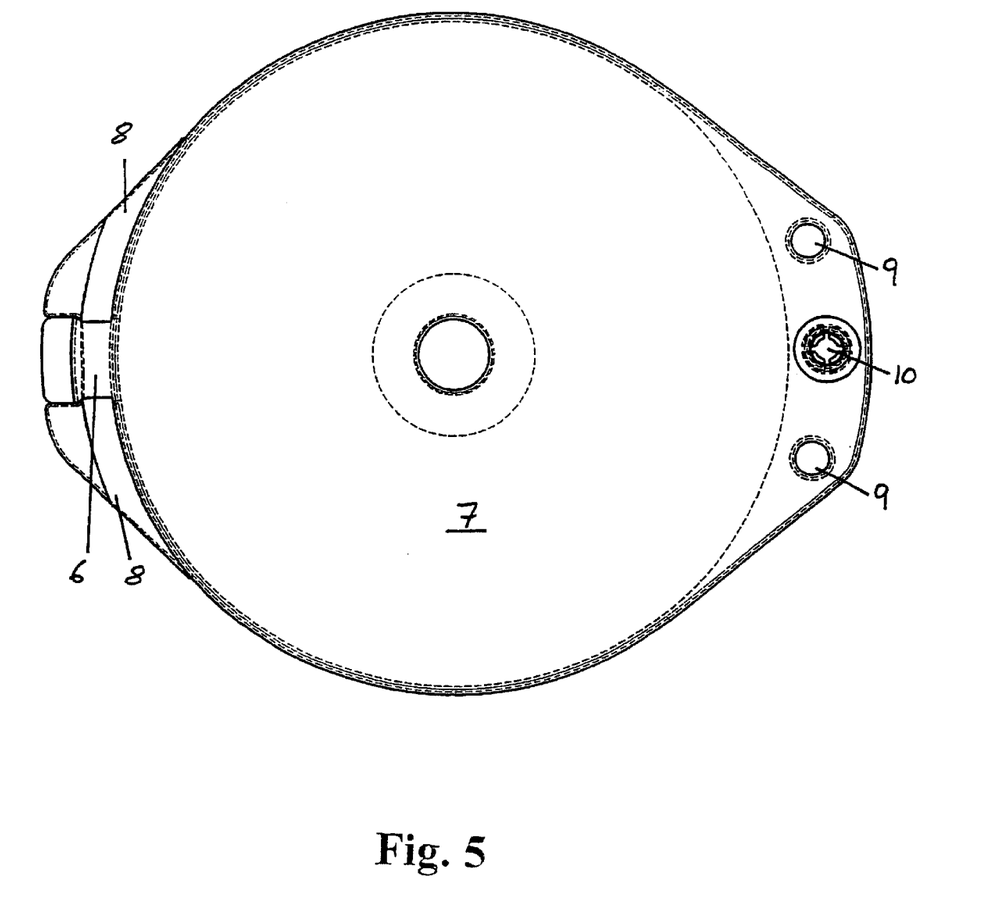
FIG. 5 shows the CD cover in FIGS. 1–4 in the closed position.

The upper part 7 is hinged to the lower part 1, so that the upper part 7 can be swivelled relative to the lower part 1, and FIG. 5 shows the CD cover in the closed position, the upper part 7 having been pivoted about the hinging means 9 so as to make the upper part 7 cover the lower part 1 completely.

Figure 6:
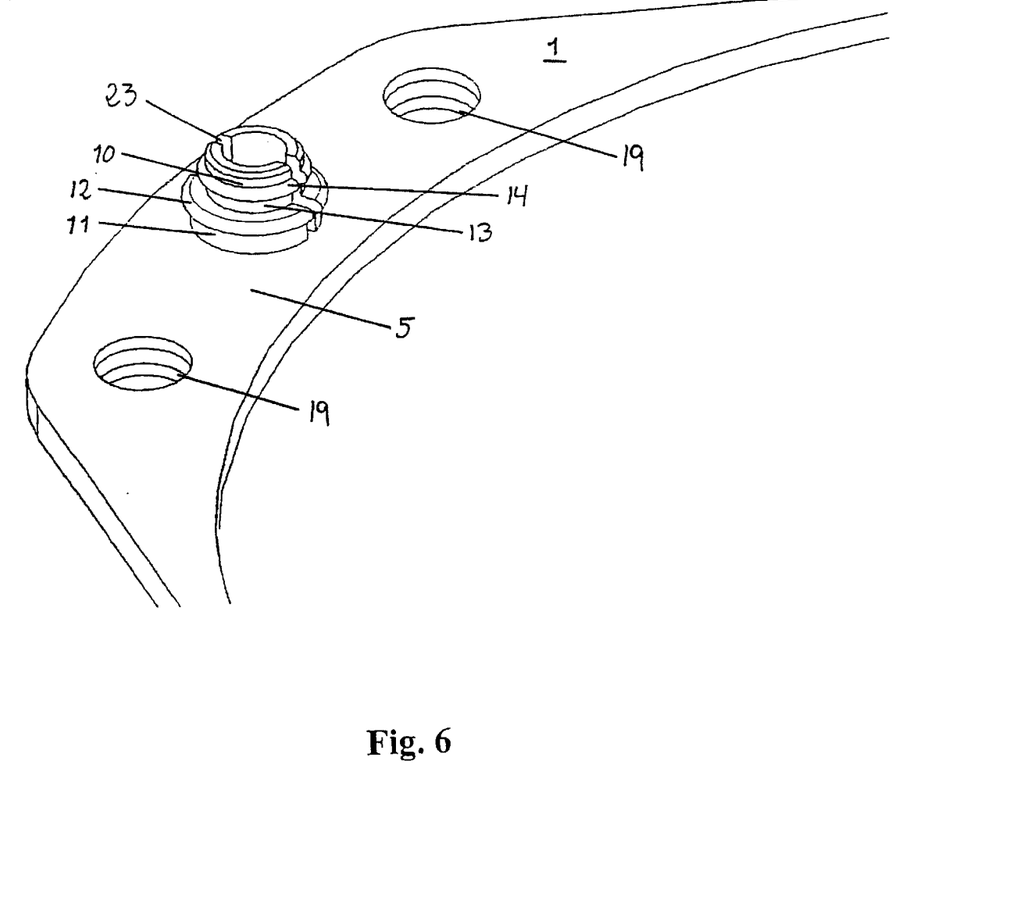
FIG. 6 shows a detail of the lower part of the CD holder shown in FIGS. 1–2.
Figure 7A:
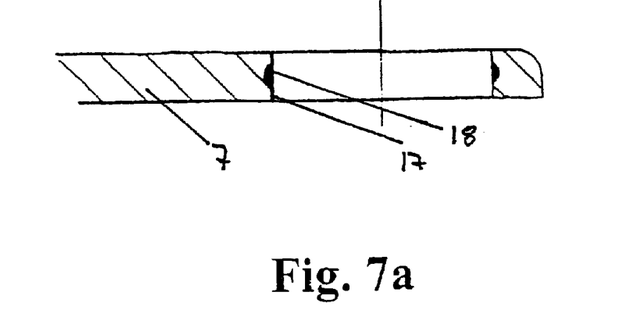
FIGS. 7a–c are sections showing the joining means of the CD holder according to the present invention.
Figure 7B:
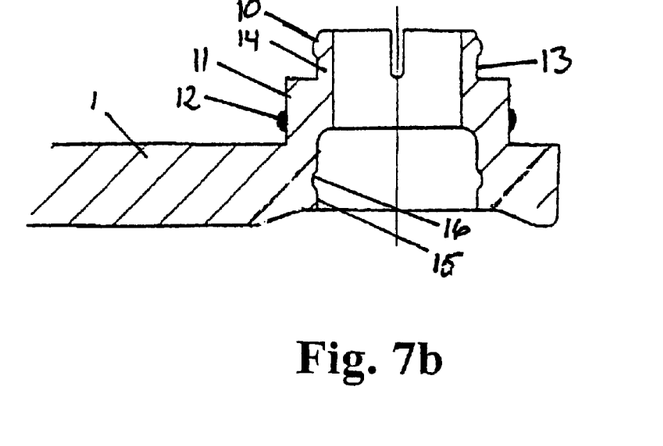
Figure 7C:
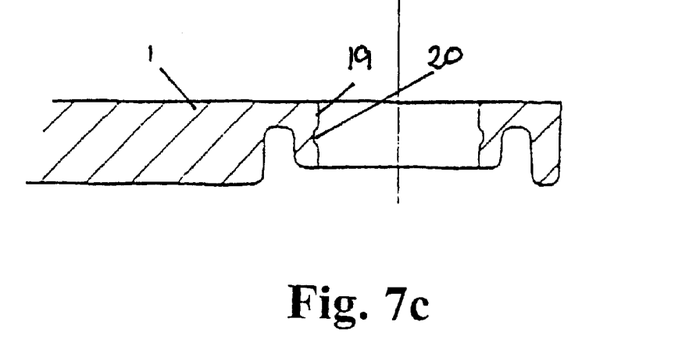

FIG. 6 shows a detail of the hinging means 5 of the lower part 1, while FIGS. 7a–c are sections that show the hole 17 of the upper part 7, (FIG. 7a), the pea 10 of the lower part 1 (FIG. 7b) and the hole 19 of the lower part 1 (FIG. 7c) respectively.

A section through the hinging means 9 of the upper part 7 and the hinging means 5 of the lower part 1 has been shown in FIGS. 7a–c.

The hinging means 5 of the lower part 1 consists of a peg 10 (FIG. 6 and 7b) with a first cylindrical portion 11 with a diameter $D_{11}$. This cylindrical portion 11 is provided with circumferential bead 12. Above this cylindrical portion 11 is another cylindrical portion 13 with a diameter $D_{13}$. This cylindrical portion 13 also is also provided with a circumferential bead 14. In the embodiment shown, $D_{11}$ is greater than $D_{13}$, while in other embodiments, $D_{11}$ may be approximately equal to $D_{13}$.

Partly below the cylindrical portion 11, the peg 10 is provided with a cylindrical opening 15 (FIG. 7b) with a diameter $d_{15}$. The diameter $d_{15}$ of the opening 15 is approximately equal to the diameter $D_{13}$ of the cylindrical portion 13. The cylindrical wall of the opening 15 is provided with a circumferential groove 16. This groove 16 is shaped so as to be complementary to the bead 14 of the cylindrical portion 13.

The hinging means of the upper pan 7 (FIG. 7a) consists of a through hole 17 with a diameter $d_{17}$. The wall of the hole 17 is provided with a circumferential groove 18. This groove 18 is shaped so as to be complementary to the bead 12 of the cylindrical portion 11. The diameter $d_{17}$ is approximately equal to the diameter $D_{11}$ of the cylindrical portion 11.

FIG. 7c shows a section through the through hole 19 of the lower part 1. The hole 19 has a diameter $d_{19}$. The cylindrical wall of the hole 19 is provided with a circumferential groove 20. This groove 20 is shaped so as to be complementary to the bead 14 of the cylindrical part 13. The diameter $d_{19}$ of the hole 19 is approximately equal to the diameter $D_{13}$ of the cylindrical part 13.

When the CD covers are assembled, i.e. the upper part 7 is attached to the lower part 1, the upper part is positioned in a manner so that its central through hole 9 is placed over the peg 10 and pressed against the lower part, so that the bead 12 on the lower part will engage the groove 18 in the hole 17. The dimensions of the bead 12 and the groove 18 will be such that the upper part and the lower part become near permanently attached to each other. The lower part 1 and the upper part 7 will however be rotatable relative to each other about an axis at right angles to the plane of the lower part and upper part. In the embodiment of the peg 10 shown in FIG. 6, the peg 10 is equipped with one or more slots 23, so as to impart a certain amount of resilience to the peg 10. When the peg 10 is inserted into the hole 17 in the upper part or into the hole 19 in another CD cover, it will be possible to compress the lug 10 until the beads 12 or 14 meet the grooves 18 or 20. By virtue of the spring action, the peg 10 will then again spring outwards, so that the beads 12 or 14 form a snap-in lock with the grooves 18 or 20. It should be noted that the snap-in locking between the lower part 1 and the upper part 7 is stronger than the snap-in locking between two or more CD covers arranged on top of each other, so as to allow the separation of two CD covers lying on top of each other.

Figure 8:
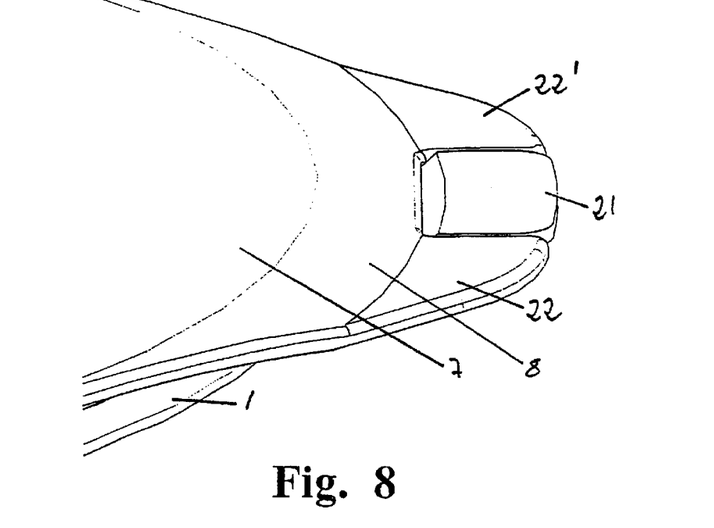
FIG. 8 shows a detail of the means of closing the CD cover.

FIG. 8 shows a locking means for closing the CD cover. The locking means 6 of the lower part 1 may have a tongue 21 and the locking means 8 of the upper part 7 may have two or more complementary tongues 22, 22'. The spacing between the tongues 22, 22' is slightly smaller than the width of the tongue 21. At the same time, either the tongue 21 and/or the tongues 22, 22' are flexible, so that a snap-in lock is formed when the tongue 21 is inserted between the tongues 22, 22'. If desired, the tongues 22, 22' may be provide on the lower part 1, while the tongue 21 may be provide on the upper part 7.

Figure 9:
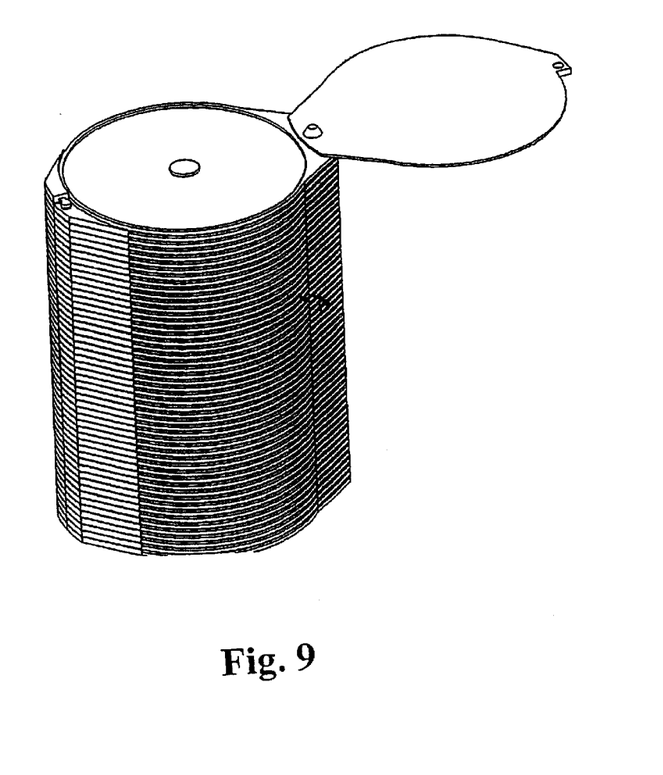
FIG. 9 is a perspective drawing showing an example of how several CD covers according to the invention may be interconnected.

When two or more CD covers are to be placed above each other, this may be done in two ways. By the one method, as shown in FIG. 9, a CD cover is placed on an overlying CD cover in such a way that the cylindrical portion 13 of a CD cover is inserted into the opening 15 in the next CD cover. The bead 14 will then be led into the groove 16 and form a separable engagement. By placing several CD covers on top of each other in this manner, an approximately cylindrical stack of CD covers will result. Each CD cover will be rotatable about an axis that is parallel with the direction of the height of the cylindrical stack.

Figure 10:
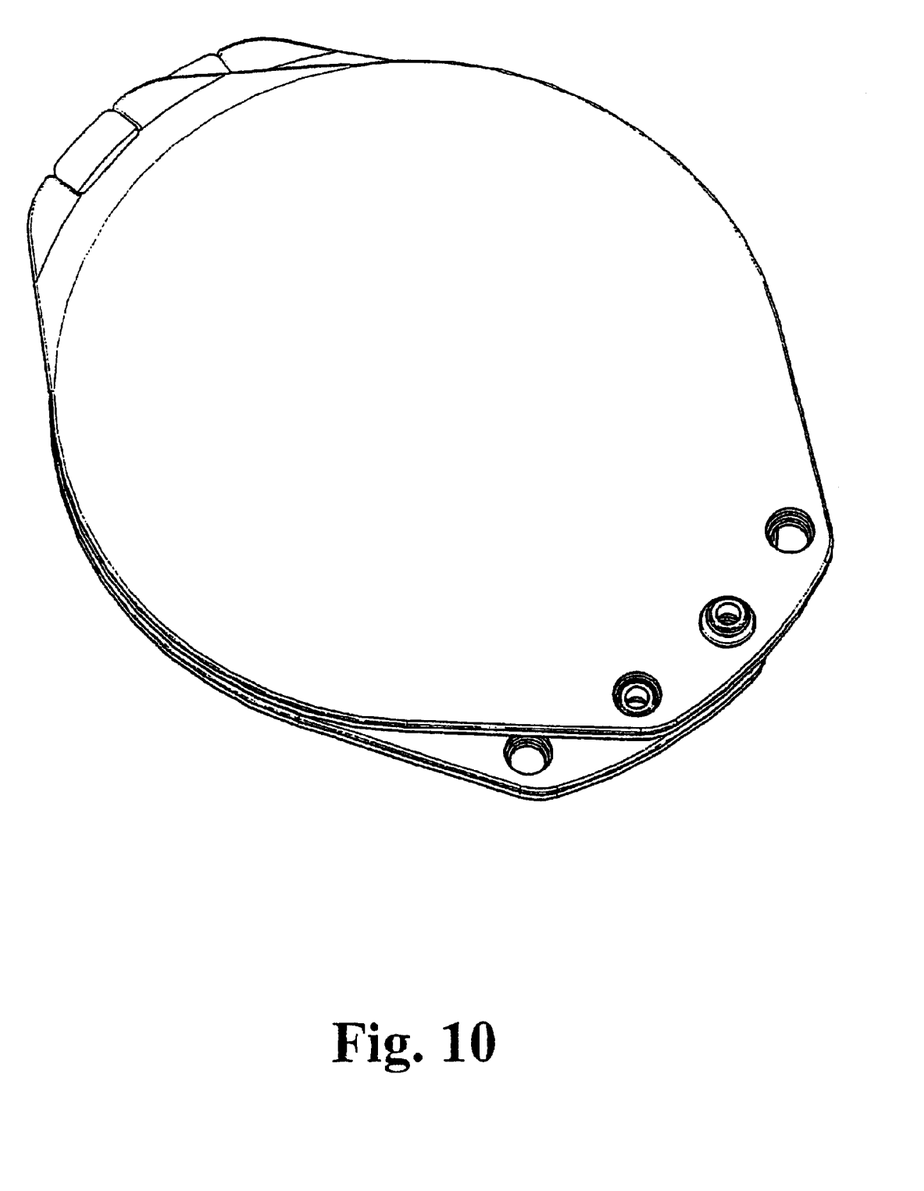
FIG. 10 shows an alternative method of stacking the CD covers according to the invention.

By an alternative method of stacking shown in FIG. 10, the CD covers are stacked in a staggered manner relative to each other. A CD cover is then placed on an underlying CD cover in a manner so that the cylindrical portion 13 is inserted into one of the holes 19 in the next CD cover. The bead 14 of the cylindrical portion 13 will then form a separable engagement with the groove 20 in the hole 19. The CD covers will then be rotatable in parallel with each other.

The lower part 1 and the upper part 7 may be made from e.g. clear plastic or from a metal such as magnesium or aluminium, if it is desirable for the CD cover to have greater strength.

As an alternative to the embodiment described in connection with FIGS. 6 and 7a–c, it is possible to form the beads 12, 14 and the grooves 18, 16 and 20 in an alternative manner. The beads 12 and 14 may be provided in the holes 17 and 15, and correspondingly the grooves 16 and 20 may be provided on the cylindrical parts 11 and 13. As vet another alternative, a separate ring may be used instead of the beads 12, 14, and the beads 12, 14 must then be replaced by grooves with a complementary shape.

As a further alternative, the cylindrical portions 11 and 13 may take the form of a frustum of a cone, and the holes 19 and 15 will then have a complementary conical shape.

What is claimed is:

1. A cover for storing and sending a compact disc, the cover comprising:
   an upper part;
   a lower part;
   wherein the upper part and the lower part are adapted to be swivelled relative to each other;
   wherein one of the upper part and the lower part is provided with:
      a portion for placement of the compact disc;
      means for retaining the compact disc; and
      means for attaching the upper part and the lower part to each other in a separable manner;
   wherein the lower part and the upper part are adapted to be hinged to each other and are adapted to be swivelled through an angle of 360° in parallel relative to each other;
   wherein hinge portions of the upper part and the lower part comprise peg-and-hole means; and
   wherein an interior of a peg of the peg-and-hole means is hollow and shaped complementary to a top of the peg, so that a peg from an underlying cover may be inserted into and engage a hollow part of a peg of an overlying cover.

2. The cover of claim 1, the peg-and-hole means having complementary shapes for formation of a rotatable snap-in locking device.

3. The cover of any of claims 1–2, wherein the lower part further comprises at least one hole, each of the at least one hole being shaped so as to be complementary to a peg of a second cover such that the cover may be attached to the second cover.

4. The cover of any of claims 1–2, wherein the lower part and the upper part are each provided with complementary locking means for closing the lower part and the upper part together.

5. The cover of any of claims 1–2, wherein the cover comprises at least one of plastic and metal.

6. The cover of claim 5, wherein the metal is selected from the group consisting of magnesium and aluminum.

7. The cover of claim 5, wherein the metal comprises at least one of magnesium and aluminum.

8. A cover for storing and sending a compact disc, the cover comprising:
   an upper part;
   a lower part;
   wherein the upper part and the lower part are adapted to be swivelled relative to each other;
   wherein one of the upper part and the lower part is provided with:
      a portion for placement of the compact disc;
      means for retaining the compact disc; and
      means for attaching the upper part and the lower part to each other in a separable manner;
   wherein the lower part and the upper part are adapted to be hinged to each other and are adapted to be swivelled through an angle of 360° in parallel relative to each other; and
   wherein the lower part and the upper part are each provided with complementary locking means for closing the lower part and the upper part together.

* * * * *